Feb. 16, 1926.
1,573,730
H. MAYS
VALVE ATTACHMENT
Filed April 18, 1925
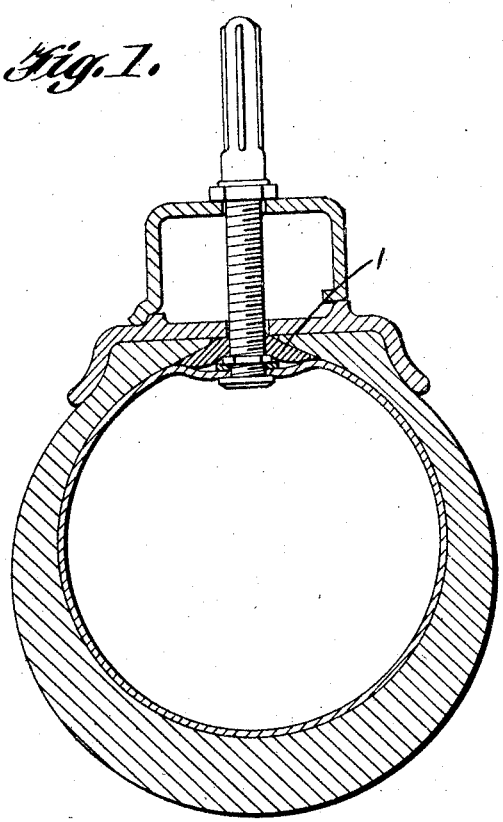
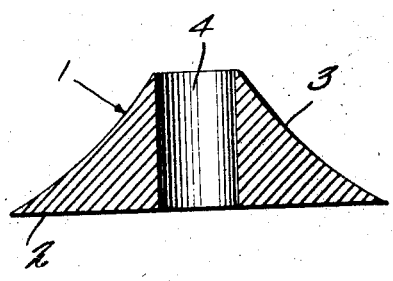
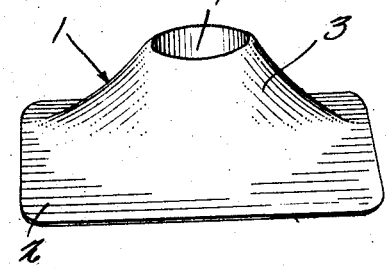
Hubert Mays
INVENTOR
BY Victor J. Evans
ATTORNEY Patented Feb. 16, 1926.

1,573,730

UNITED STATES PATENT OFFICE.

HUBERT MAYS, OF OKMULGEE, OKLAHOMA.

VALVE ATTACHMENT.

Application filed April 18, 1925. Serial No. 24,176.

To all whom it may concern:

Be it known that I, HUBERT MAYS, a citizen of the United States, residing at Okmulgee, in the county of Okmulgee and State of Oklahoma, have invented new and useful Improvements in Valve Attachments, of which the following is a specification.

This invention relates to a pad for use with a pneumatic tire, the general object of the invention being to provide means for preventing water or moisture from entering the tire through the hole made for the valve stem.

Another object of the invention is to prevent wear of the valve stem by the rim.

This invention also consists in certain other features of construction and in the combination and arrangement of the several parts, to be hereinafter fully described, illustrated in the accompanying drawings and pointed out in the appended claim.

In describing my invention in detail, reference will be had to the accompanying drawings wherein like characters denote like or corresponding parts throughout the several views, and in which:—

Figure 1 is a transverse sectional view through a tire and a rim showing the invention in use.

Figure 2 is a sectional view through the device itself.

Figure 3 is a perspective view of the device.

As is well known, water leaking through the holes in the various parts of a wheel and tire made for the valve stem will rust the rim and cause damage to the tube of the tire. In order to prevent this leakage, I provide a pad 1 of rubber or the like and which is placed on the stem between the beads of the tire, as shown in Figure 1. Thus when the tube is inflated, the pressure will force the pad tightly in the hole in the rim and around the stem and prevent the entrance of water or moisture through the hole in the rim. In some cases, the device is placed over the beads of the tire so as to not interfere with the use of a flap. The pad is formed with a rectangular base part 2 and with a cone-shaped body 3, the opening 4 passing through the center of the device. By providing the conical shape body 3 with a flexible rectangular base it will be noted that the pad when arranged in position as shown in Figure 1 and the stem securely positioned, the pad will lay comparatively flat and eliminate bulging to a great extent in the tire so as to reduce the wear on the tire at this point, particularly the inner casing. Attention is also directed to the fact that when the pad is placed between the rim and the beads of the outer casing the flexible rectangular member will span the space usually remaining between the beads and assist in keeping moisture from the stem and due to the shape of the base will lay comparatively flat between the rim and the beads of the tire. The device will not interfere with the assembling of the tire in the rim and the tube in the tire. The pad can be used on different sizes of tires and its use will prevent rusting of the rim and damage to the tube and tire. This device will also prevent wear of the stem by a rim as sometimes the stem does not lie in the center of the hole in the rim so that one part of the wall of the hole will engage the stem and thus wear a hole in the same to cause an air leak at this point. This pad will take this wear and prevent the stem being touched by the rim.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A pad for preventing entrance of moisture through the valve stem hold of a rim of a pneumatic tire, including a cone shaped body, a flexible rectangular shaped base with an opening passing centrally through the pad to receive the valve stem, said pad being positioned to span the space between the beads of a tire.

In testimony whereof I affix my signature.

HUBERT MAYS.